(12) United States Patent
Koike

(10) Patent No.: US 12,177,392 B2
(45) Date of Patent: Dec. 24, 2024

(54) INFORMATION PROCESSING SYSTEM, IMAGE PROCESSING APPARATUS, INFORMATION PROCESSING APPARATUS, SERVER APPARATUS, INFORMATION PROCESSING METHOD, AND STORAGE MEDIUM

(71) Applicant: CANON KABUSHIKI KAISHA, Tokyo (JP)

(72) Inventor: Kohtaro Koike, Kanagawa (JP)

(73) Assignee: Canon Kabushiki Kaisha, Tokyo (JP)

( * ) Notice: Subject to any disclaimer, the term of this patent is extended or adjusted under 35 U.S.C. 154(b) by 119 days.

(21) Appl. No.: 17/701,066

(22) Filed: Mar. 22, 2022

(65) Prior Publication Data
US 2022/0311881 A1    Sep. 29, 2022

(30) Foreign Application Priority Data

Mar. 24, 2021  (JP) ................................ 2021-050079
Jan. 28, 2022  (JP) ................................ 2022-012431

(51) Int. Cl.
| | |
|---|---|
| *H04N 1/00* | (2006.01) |
| *G06F 21/36* | (2013.01) |
| *G06F 21/44* | (2013.01) |
| *H04L 9/40* | (2022.01) |
| *H04N 1/32* | (2006.01) |

(Continued)

(52) U.S. Cl.
CPC ......... *H04N 1/00244* (2013.01); *G06F 21/36* (2013.01); *G06F 21/445* (2013.01); *H04L 63/0876* (2013.01); *H04N 1/32106* (2013.01); *H04W 12/50* (2021.01); *H04W 12/77* (2021.01); *G06F 2221/2103* (2013.01); *G06F 2221/2117* (2013.01); *H04N 2201/0084* (2013.01)

(58) Field of Classification Search
CPC .......... H04N 1/00244; H04N 1/32106; H04N 2201/0084; H04W 12/77; H04W 12/50; G06F 21/36; G06F 21/445; G06F 2221/2103; G06F 2221/2117; H04L 63/0876
USPC ....................................... 348/689
See application file for complete search history.

(56) References Cited

U.S. PATENT DOCUMENTS 8,887,262 B1 *  11/2014  Turner ................. H04W 12/06
                                                        726/10
11,283,937 B1 *  3/2022  Svendsen ............ G06V 40/172
(Continued)

FOREIGN PATENT DOCUMENTS

| CN | 108923927 A | 11/2018 |
| CN | 110704002 A | 1/2020 |

(Continued)

*Primary Examiner* — John W Miller
*Assistant Examiner* — Sean N. Haiem
(74) *Attorney, Agent, or Firm* — Canon U.S.A., Inc. IP Division

(57) ABSTRACT

A camera generates a random number, displays a Quick Response (QR) code representing the generated random number, and transmits the generated random number to a web server. A smart phone captures an image of the QR code displayed on the camera, acquires the random number based on the captured QR code, and transmits the acquired random number to the web server. The web server registers the camera based on a match between the random number transmitted from the camera and the random number transmitted from the smart phone.

17 Claims, 14 Drawing Sheets

(51) Int. Cl.
*H04W 12/50* (2021.01)
*H04W 12/77* (2021.01)

(56) References Cited

U.S. PATENT DOCUMENTS

| | | | | |
|---|---|---|---|---|
| 2006/0279628 | A1* | 12/2006 | Fleming | H04N 5/76 348/E7.086 |
| 2007/0032193 | A1* | 2/2007 | Wada | H04M 1/72412 455/41.2 |
| 2010/0225653 | A1* | 9/2010 | Sao | H04L 51/58 455/412.2 |
| 2010/0283586 | A1* | 11/2010 | Ikeda | H04N 1/00899 340/10.42 |
| 2013/0219479 | A1* | 8/2013 | DeSoto | H04L 63/10 726/6 |
| 2014/0112551 | A1* | 4/2014 | Terwilliger | G06K 7/0004 235/375 |
| 2014/0317713 | A1* | 10/2014 | Gadotti | G06F 21/36 726/7 |
| 2015/0088674 | A1* | 3/2015 | Flurscheim | G06Q 20/326 705/17 |
| 2015/0172061 | A1 | 6/2015 | Lee et al. | |
| 2015/0172910 | A1* | 6/2015 | Tani | H04L 51/06 455/419 |
| 2015/0358400 | A1* | 12/2015 | Bartlett, II | H04W 12/10 709/201 |
| 2016/0112422 | A1* | 4/2016 | Watanabe | H04L 63/0838 726/28 |
| 2016/0232393 | A1* | 8/2016 | Nakajima | H04W 12/50 |
| 2017/0264608 | A1* | 9/2017 | Moore | G07C 9/257 |
| 2018/0048474 | A1* | 2/2018 | Landrock | G06F 21/36 |
| 2018/0189714 | A1* | 7/2018 | Azpitarte | H04W 12/63 |
| 2019/0043148 | A1* | 2/2019 | Vemury | G06K 19/06037 |
| 2022/0147648 | A1* | 5/2022 | Babcock | G06F 21/6245 |
| 2022/0231872 | A1* | 7/2022 | Lum | H04L 12/189 |

FOREIGN PATENT DOCUMENTS

| | | |
|---|---|---|
| EP | 2887718 A1 | 6/2015 |
| JP | 2015114724 A | 6/2015 |
| WO | 2017070412 A1 | 4/2017 |

* cited by examiner

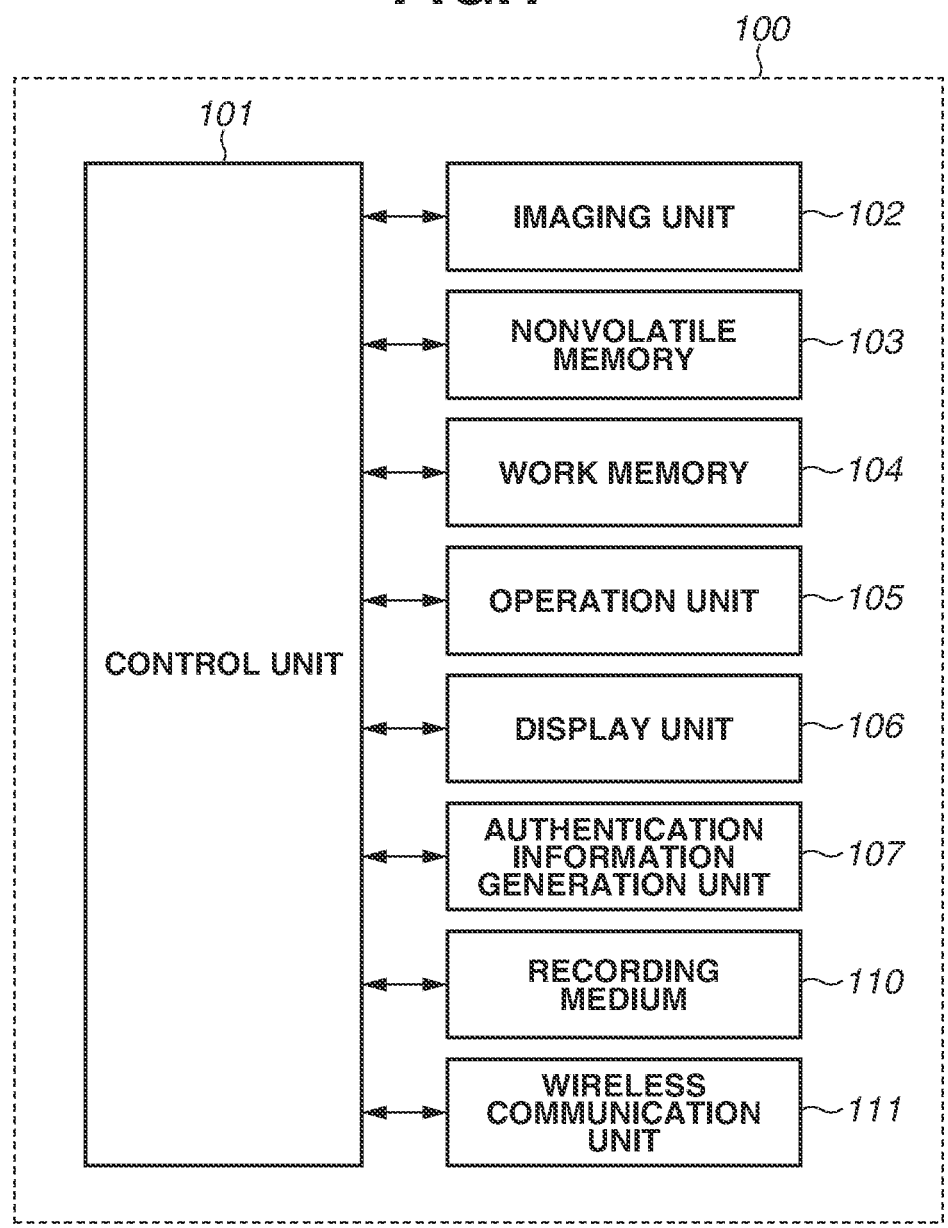

INFORMATION PROCESSING SYSTEM, IMAGE PROCESSING APPARATUS, INFORMATION PROCESSING APPARATUS, SERVER APPARATUS, INFORMATION PROCESSING METHOD, AND STORAGE MEDIUM

BACKGROUND OF THE INVENTION

Field of the Invention

The present invention relates to an information processing system for registering an image processing apparatus to a server apparatus, the image processing apparatus, an information processing apparatus, the server apparatus, an information processing method, and a storage medium.

Description of the Related Art

An image processing apparatus, such as a digital camera (hereinafter referred to as a camera), has the function of transmitting an image captured by the image processing apparatus to an external web service through wireless communication, such as a communication based on Wi-Fi (registered trademark). Examples of external web services include Facebook (registered trademark) and Google Photos (registered trademark). There is a system that include a camera and a web server (server apparatus) mediating between the camera and an external web service. With the registration of the camera to the web server, the camera is enabled to transmit an image to the web server, and the web server is enabled to transmit an image to the external web service.

To register the camera to the web server, it is necessary to associate the camera with account information for a service provided by the web server. It is known that, to make this association, the user inputs information necessary to register the camera to the web server via the user interface of the camera, and communicates with an information processing apparatus, such as the web server, a smart phone, and a personal computer.

A system discussed in Japanese Patent Application Laid-Open No. 2015-114724 receives an input of a mail address from the user via the user interface of a camera, and registers the camera to a web server by using the input mail address.

In the system discussed in Japanese Patent Application Laid-Open No. 2015-114724, the user needs to operate the camera to input the mail address as described above. However, a character input operation through the user interface of the camera is generally inferior in operability and therefore consumes much time and effort in comparison with a character input operation with a personal computer or a smart phone.

Furthermore, owners of cameras do not always have a mail account. Thus, the users who do not have a mail account need to create a mail account for the purpose of registering a camera, which degrades the user's convenience.

SUMMARY OF THE INVENTION

According to an aspect of the present invention, an information processing system includes an image processing apparatus, an information processing apparatus, and a server apparatus. The image processing apparatus includes a generation unit configured to generate identification information, a display unit configured to display an image representing the identification information generated by the generation unit, and a first transmission unit configured to transmit the identification information generated by the generation unit to the server apparatus. The information processing apparatus includes an imaging unit configured to capture the image displayed by the display unit, an acquisition unit configured to acquire the identification information based on the image captured by the imaging unit, and a second transmission unit configured to transmit the identification information acquired by the acquisition unit to the server apparatus. The server apparatus includes a first reception unit configured to receive the identification information transmitted by the first transmission unit, a second reception unit configured to receive the identification information transmitted by the second transmission unit, and a registration unit configured to register the image processing apparatus based on a match between the identification information received by the first reception unit and the identification information received by the second reception unit.

According to another aspect of the present invention, an information processing system includes an image processing apparatus, an information processing apparatus, and a server apparatus. The image processing apparatus includes a generation unit configured to generate identification information, a display unit configured to display the identification information generated by the generation unit, and a first transmission unit configured to transmit the identification information generated by the generation unit to the server apparatus. The information processing apparatus includes an input unit configured to receive, from a user, an input of the identification information displayed by the display unit and a second transmission unit configured to transmit the identification information input by the input unit to the server apparatus. The server apparatus includes a first reception unit configured to receive the identification information transmitted by the first transmission unit, a second reception unit configured to receive the identification information transmitted by the second transmission unit, and a registration unit configured to register the image processing apparatus based on a match between the identification information received by the first reception unit and the identification information received by the second reception unit.

According to yet another aspect of the present invention, an image processing apparatus capable of communicating with an information processing apparatus and a server apparatus includes a generation unit configured to generate identification information, a display unit configured to display an image representing the identification information generated by the generation unit, a transmission unit configured to transmit the identification information generated by the generation unit to the server apparatus, and a notification unit configured to notify, in a case where the image processing apparatus is registered to the server apparatus based on a match between the identification information transmitted by the transmission unit and the identification information transmitted from the information processing apparatus that has captured the image displayed by the display unit, the user that the registration is completed.

According to yet further another aspect of the present invention, an information processing apparatus capable of communicating with an image processing apparatus and a server apparatus includes an imaging unit configured to capture an image displayed on the image processing apparatus, an acquisition unit configured to acquire identification information based on the image captured by the imaging unit, a transmission unit configured to transmit the identification information acquired by the acquisition unit to the server apparatus, and a notification unit configured to notify, in a case where the image processing apparatus is registered to the server apparatus based on a match between the identification information transmitted by the transmission unit and the identification information transmitted from the image processing apparatus to the server apparatus, the user that the registration is completed.

According to still yet further another aspect of the present invention, a server apparatus capable of communicating with an image processing apparatus and an information processing apparatus includes a first reception unit configured to receive identification information generated by the image processing apparatus from the image processing apparatus, a second reception unit configured to receive, from the information processing apparatus that has captured an image displayed on the image processing apparatus, the identification information acquired based on the captured image, and a registration unit configured to register the image processing apparatus based on a match between the identification information received by the first reception unit and the identification information received by the second reception unit.

Further features of the present invention will become apparent from the following description of exemplary embodiments with reference to the attached drawings.

BRIEF DESCRIPTION OF THE DRAWINGS

FIG. 1 is a block diagram illustrating a camera according to first and second exemplary embodiments.

DESCRIPTION OF THE EMBODIMENTS

Figure 2A:
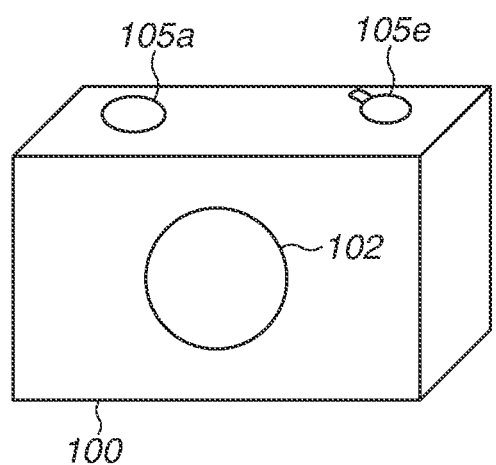
FIGS. 2A and 2B each illustrate an outer appearance of the camera according to the first and second exemplary embodiments.

Exemplary embodiments of the present invention will be described below with reference to the accompanying drawings. Configurations described in the following exemplary embodiments are to be considered illustrative, and the present invention is not limited to illustrated configurations.

A first exemplary embodiment of the present invention will be described below. FIG. 1 illustrates an example of a hardware configuration of a camera 100 according to exemplary embodiments of the present invention. In the present exemplary embodiment, a description will be provided of the camera 100 as an example of an image processing apparatus. However, the image processing apparatus is not limit to the camera 100 as long as the apparatus processes an image, such as a printer for printing an image and a video camera for capturing a moving image.

A control unit 101 controls each unit of the camera 100 according to an input signal and a program (descried below). Instead of the control unit 101 controlling the entire apparatus, a plurality of hardware components may share processing to control the entire apparatus.

An imaging unit 102 includes, for example, an optical lens unit, an optical system for controlling diaphragm, zoom, and focus, and an image sensor for converting light (image) introduced via the optical lens unit into an electrical image signal. As the image sensor, a complementary metal oxide semiconductor (CMOS) sensor or a charge coupled device (CCD) sensor is generally used. Under the control of the control unit 101, the imaging unit 102 converts subject light the image of which is funned by a lens included in the imaging unit 102 into an electrical signal via the image sensor, subjects the signal to noise reduction processing, and outputs digital data as image data. The camera 100 according to the present exemplary embodiment records image data in a recording medium 110 according to the Design Rule for Camera File system (DCF) standard.

A nonvolatile memory 103 which is an electrically erasable rewritable nonvolatile memory stores therein programs (described below) to be executed by the control unit 101 and the like. A work memory 104 is used as a buffer memory for temporarily storing image data captured by the imaging unit 102, as an image display memory for a display unit 106, and as a work area for the control unit 101.

An operation unit 105 functions as a user interface for receiving instructions to the camera 100 from the user. The operation unit 105 includes, for example, a power button for issuing an instruction to turn power of the camera 100 ON and OFF, a release button for issuing an instruction to capture an image, and a playback button for issuing an instruction to reproduce image data. The operation unit 105 further includes operation members, such as a dedicated connection button for starting communication with an external apparatus via a wireless communication unit 111 (described below). The operation unit 105 also includes a touch panel formed on the display unit 106 (described below). The release button includes switches 1 and 2. The switch 1 turns ON when the release button is half-pressed. Thus, the operation unit 105 receives an instruction to perform a shooting preparation operation, such as automatic focus (AF) processing, automatic exposure (AE) processing, automatic white balance (AWB) processing, and flash preliminary emission (EP) processing. The switch 2 turns ON when the release button is fully pressed. Thus, the operation unit 105 receives an instruction to perform image capturing.

The display unit 106 displays a view finder image during image capturing, captured image data, and texts for interactive operations. The display unit 106 also includes indicators that go ON, blink, and go OFF to indicate, for example, the access state of the recording medium 110 (described below) and the communication state of the wireless communication unit 111. The camera 100 does not necessarily need to include the display unit 106. The camera 100 is at least to be connectable to the internal or external display unit 106 and to have a display control function for controlling the display of the display unit 106.

An authentication information generation unit 107 generates authentication information to be used to register the camera 100 to the web server 400. The authentication information includes a random number (described below) and a Quick Response (QR) code (registered trademark). The authentication information generation unit 107 may be provided not as a hardware module but as a software module implemented by the control unit 101.

The recording medium 110 can record the image data output from the imaging unit 102.

The recording medium 110 may be attachable to and detachable from the camera 100 or built in the camera 100. More specifically, the camera 100 is at least to have a method for accessing the recording medium 110.

The wireless communication unit 111 is an interface for connecting to an external apparatus. The camera 100 according to the present exemplary embodiment is able to exchange data with the external apparatus via the wireless communication unit 111. For example, image data generated by the imaging unit 102 can be transmitted to the external apparatus via the wireless communication unit 111. According to the present exemplary embodiment, the wireless communication unit 111 includes an interface for performing communication with an external apparatus based on Wi-Fi (registered trademark) conforming to the Institute of Electrical and Electronics Engineers (IEEE) 802.11 standard. The control unit 101 controls the wireless communication unit 111 to implement wireless communication with the external apparatus. The communication method is not limited to Wi-Fi (registered trademark) but includes, for example, an infrared communication method. The wireless communication unit 111 is an example of a first wireless communication unit. A smart phone 500 (described below) has a similar hardware configuration to that of the camera 100 described above with reference to FIG. 1. The smart phone 500 will be described below as an example of an information processing apparatus, the information processing apparatus may be an apparatus other than the smart phone 500 as long as it is capable of capturing an image of the QR code.

Figure 2B:
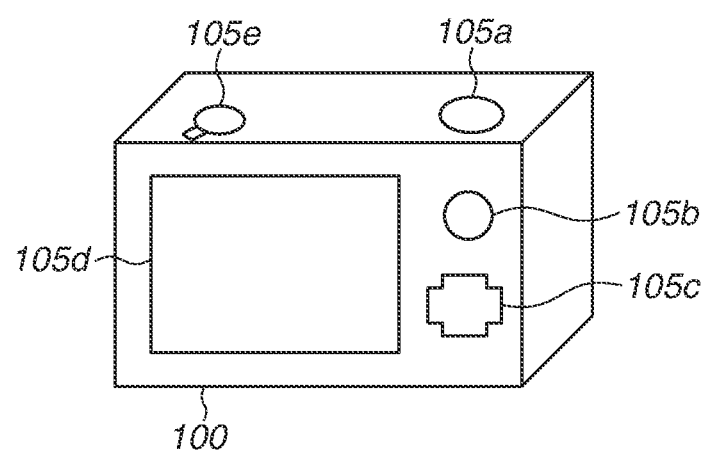

The outer appearance of the camera 100 will be described below. FIGS. 2A and 2B illustrate examples of outer appearances of the camera 100. A release button 105a, a playback button 105b, a direction key 105c, a touch panel 105d, and a power lever 105e are operation members included in the operation unit 105. The display unit 106 displays an image obtained as a result of image capturing by the imaging unit 102, a QR code (described below), and a notification indicating a result of the registration of the camera 100 to the web server 400.

Figure 3:
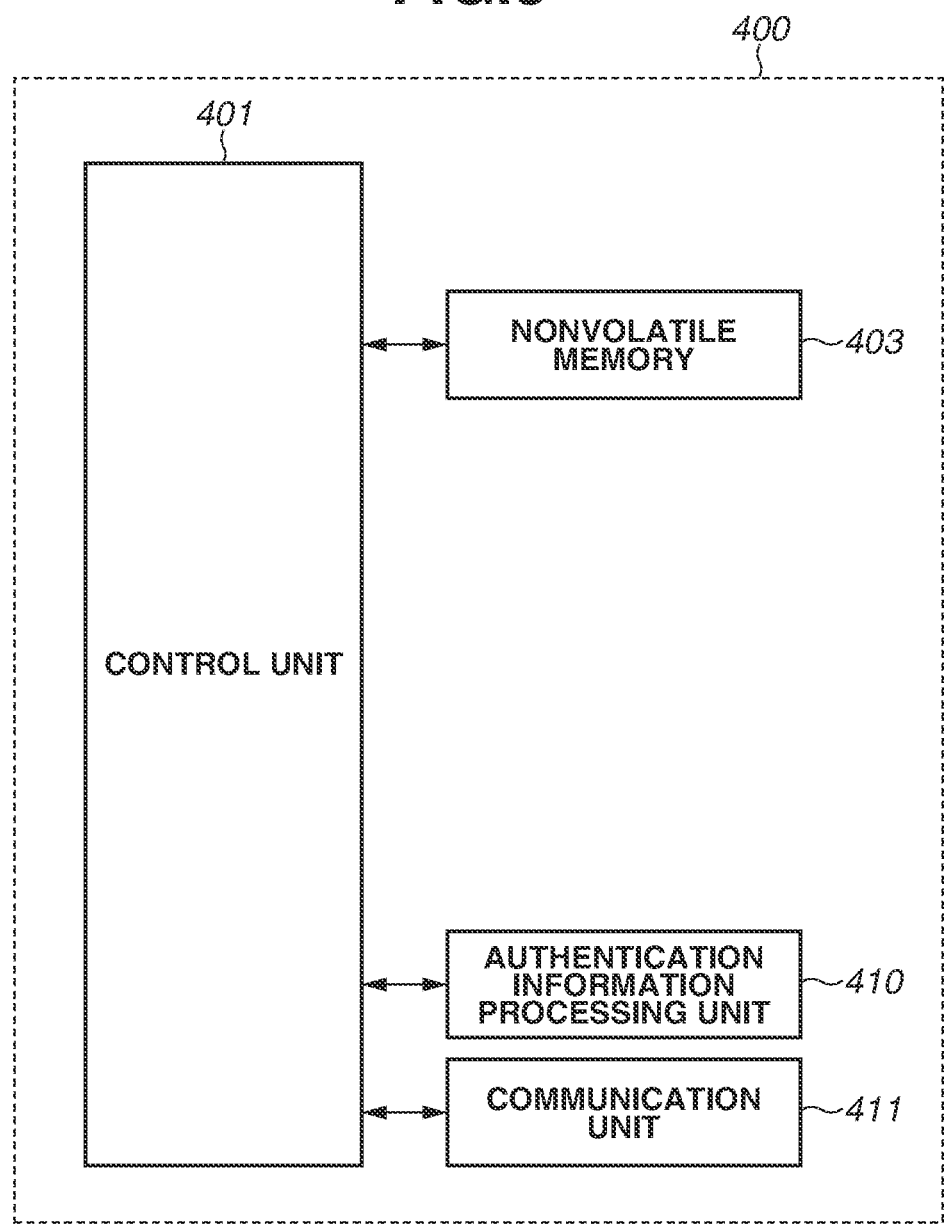
FIG. 3 is a block diagram illustrating a web server according to the first and second exemplary embodiments.

FIG. 3 illustrates an example of a hardware configuration of the web server 400 as an example of a server apparatus to which the camera 100 is registered. A control unit 401 controls each unit of the web server 400 in accordance with an input signal and/or a program (descried below). Instead of the control unit 401 controlling the entire apparatus, a plurality of hardware components may share processing to control the entire apparatus.

A nonvolatile memory 403 which is an electrically erasable rewritable nonvolatile memory stores therein programs (described below) to be executed by the control unit 401 and information about the camera 100 to be registered.

An authentication information processing unit 410 performs login authentication of the user using the web server 400 from an information processing apparatus, such as the smart phone 500 (described below). In a case where the login authentication is successful, the authentication information processing unit 410 generates an authentication key that uniquely defines an information processing apparatus. The authentication information processing unit 410 performs authentication when a random number is notified from the camera 100. The authentication information processing unit 410 may be provided not as a hardware module but as a software module implemented by the control unit 401.

A communication unit 411 is an interface for connecting to an external apparatus via a public network 300. The web server 400 according to the present exemplary embodiment can exchange data with the camera 100 and the smart phone 500 via the public network 300. According to the present exemplary embodiment, the communication unit 411 is not limited to either wireless or wire lined communication.

Figure 4:
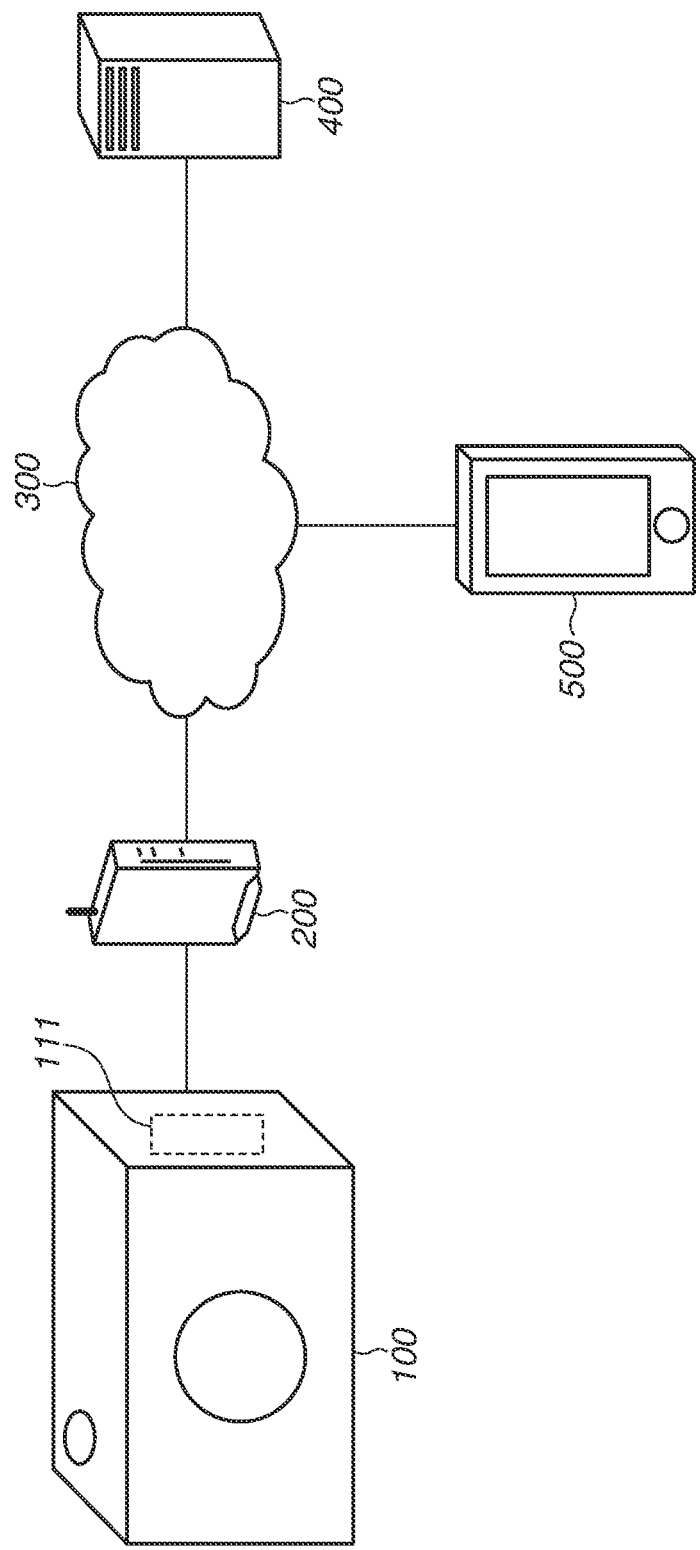
FIG. 4 is a schematic view illustrating the entire system according to the first exemplary embodiment.

FIG. 4 is a schematic view illustrating the entire system including the camera 100, an access point 200, the public network 300, the web server 400, and the smart phone 500. In the system according to the present exemplary embodiment, the camera 100, the web server 400, and the smart phone 500 are communicably connected to each other.

Figure 5:
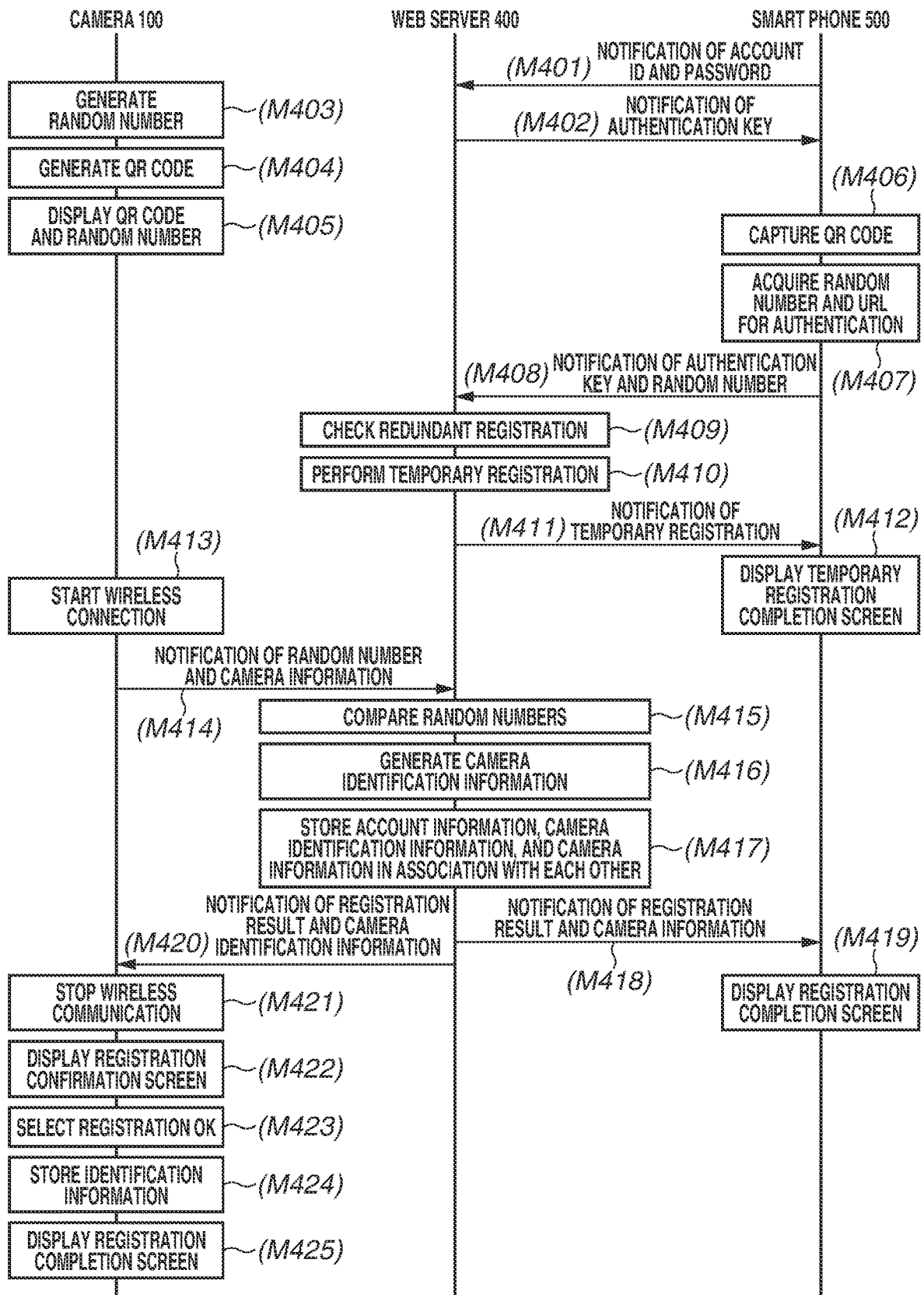
FIG. 5 is a sequence diagram illustrating overall processing according to the first exemplary embodiment.

FIG. 5 is a sequence diagram according to the present exemplary embodiment in which the user captures the image of the QR code displayed on the camera 100 with the smart phone 500 and then registers the camera 100 to the web server 400.

Initially, in step M401, the smart phone 500 notifies the web server 400 of the account identifier (ID) and a password to log into the web server 400. The account ID and the password may be stored in the smart phone 500 or input by the user at each login time. In a case where the authentication information processing unit 410 performs the login authentication and the login authentication succeeds, in step M402, the web server 400 generates an authentication key for uniquely identifying the user and then distributes the authentication key to the smart phone 500.

Meanwhile, in response to the camera 100 receiving an instruction to register the camera 100 to the web server 400 from the user via the operation unit 105, then in step M403, the control unit 101 instructs the authentication information generation unit 107 to generate a random number. In step M404, the control unit 101 generates a QR code based on the random number generated in step M403 and a Uniform Resource Locator (URL) to be accessed by the smart phone 500 to perform the authentication processing with the web server 400. After generating a QR code, then in step M405, the control unit 101 instructs the display unit 106 to display the QR code and the random number. In this case, a random number has been described above as an example of identification information, and a QR code has been described as an example of an image representing the identification information, the present invention is not limited thereto. For example, a combination of numbers other than random numbers may be used as identification information, and an image in other than the QR code format may be used as an image representing the identification information.

When the QR code is displayed in step M405, then in step M406, the smart phone 500 captures an image of the QR code. In step M407, the smart phone 500 analyzes the captured QR code to acquire the random number and the URL for authentication. In step M408, the smart phone 500 subsequently accesses the URL for authentication and notifies the web server 400 of the random number and the authentication key distributed from the web server 400 in step M402.

In response to receiving the random number and the authentication key from the smart phone 500, then in step M409, the web server 400 checks whether the same random number has redundantly been received, via the authentication information processing unit 410. Redundant reception in this case includes the reception from the smart phone 500 and the reception from an information processing apparatus other than the smart phone 500. If it is confirmed that the same random number has not redundantly been received, then in step M410, the web server 400 temporarily stores the authentication key and the random number as temporary registration information. In step M411, the web server 400 notifies the smart phone 500 that the temporary registration is completed.

In step M412, the smart phone 500 displays a message indicating that the temporary registration is completed, and prompts the user to continue the registration processing. This guidance to the user includes a message for promoting the user to operate the camera 100. In a case where a duplicated random number is notified from the smart phone 500 in step M408, the web server 400 notifies the smart phone 500 of a duplication error without performing the temporary registration. Furthermore, the web server 400 erases the temporarily registered information.

After the temporary registration, in step M413, the camera 100 activates the wireless communication unit 111 based on a user operation on the operation unit 105 to start a wireless connection to the web server 400 via the access point 200 and the public network 300. In step M414, the camera 100 notifies the camera 100 of the random number generated in step M403 and information specific (referred to as camera information or "apparatus information") to the web server 400. Examples of pieces of the information specific to the camera 100 include the serial number of the camera 100, the Media Access Control (MAC) address, and the model ID.

The activation of the wireless communication unit 111 may be performed before step M403. According to the present exemplary embodiment, the camera 100 activates the wireless communication unit 111 in step M413 so that the power consumption of the wireless communication unit 111 is controlled in the period from step M403 to step M412.

In response to receiving the random number, then in step M415, the web server 400 compares the received random number with the random number included in the temporarily stored temporary registration information to determine whether an identical random number is present. If an identical random number is present, then in step M416, the authentication information processing unit 410 generates camera identification information (apparatus identification information) for uniquely identifying the camera 100. In a case where the camera 100 communicates with (uploads image data to) the web server 400 after the registration to the web server 400, the camera 100 transmits image data including the camera identification information. The web server 400 identifies the camera 100 based on the camera identification information. In step M417, the web server 400 subsequently stores the account information and the camera information associated with the authentication key, and the camera identification information in association with one another. The associated information is stored in the nonvolatile memory 403. As a result of this processing, the camera 100 is registered to the web server 400.

After the camera 100 is registered to the web server 400 in step M417, then in step M418, the web server 400 notifies the smart phone 500 that the registration is completed and transmits the camera information. In step M419, the smart phone 500 displays the camera information together with the information that the registration is completed. Here, the smart phone 500 displays the camera information to enable the user to make sure that the camera 100 has been properly registered.

In step M420, the web server 400 notifies the camera 100 that the registration is successful and transmits the camera identification information. In response to receiving a result indicating the successful registration and the camera identification information, then in step M421, the control unit 101 of the camera 100 deactivates the wireless communication unit 111. In step M422, the control unit 101 displays a message indicating that the registration to the web server 400 is successful, a message for prompting the user to confirm whether to store the camera identification information, and the camera information, on the display unit 106. In a case where the user confirms that the camera information displayed on the smart phone 500 in step M419 coincides with the camera information displayed on the camera 100 in step M422, then in step M423, the user selects OK. Thus, in step M424, the control unit 101 stores the camera identification information in the nonvolatile memory 103. After storing the information, then in step M425, the display unit 106 displays a message indicating that the registration is completed.

In a case where the camera information is provided in step M414 before the smart phone 500 captures an image of the QR code in step M406, in other words, before the random number is transmitted from the smart phone 500 to the web server 400 in step M408, the web server 400 notifies the camera 100 that the registration has failed.

In a case where the web server 400 does not receive the random number and the camera information from the camera 100 even after a predetermined time period has elapsed since the web server 400 notified the smart phone 500 that the temporary registration is successful in step 1411, the web server 400 erases the temporary registration information.

Figure 6:
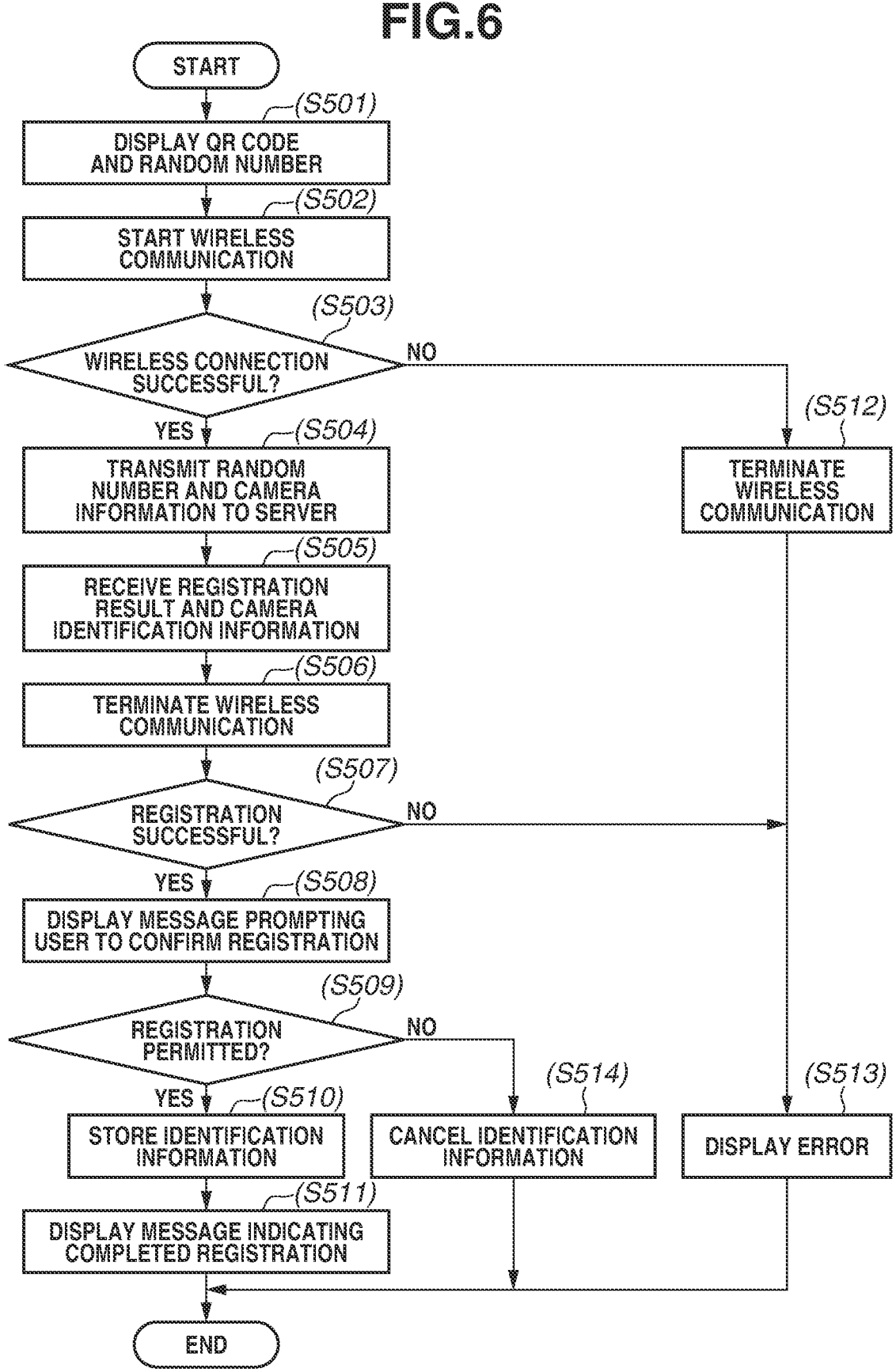
FIG. 6 is a flowchart illustrating operations of camera according to the first exemplary embodiment.

FIG. 6 is a flowchart illustrating operations of the camera 100 according to the present exemplary embodiment.

In response to receiving an instruction for the registration to the web server 400 from the user via the operation unit 105 of the camera 100, then in step S501, the control unit 101 generates a random number and displays a QR code into which data containing the random number has been coded and the numerical value of the random number itself on the display unit 106.

Figure 12:
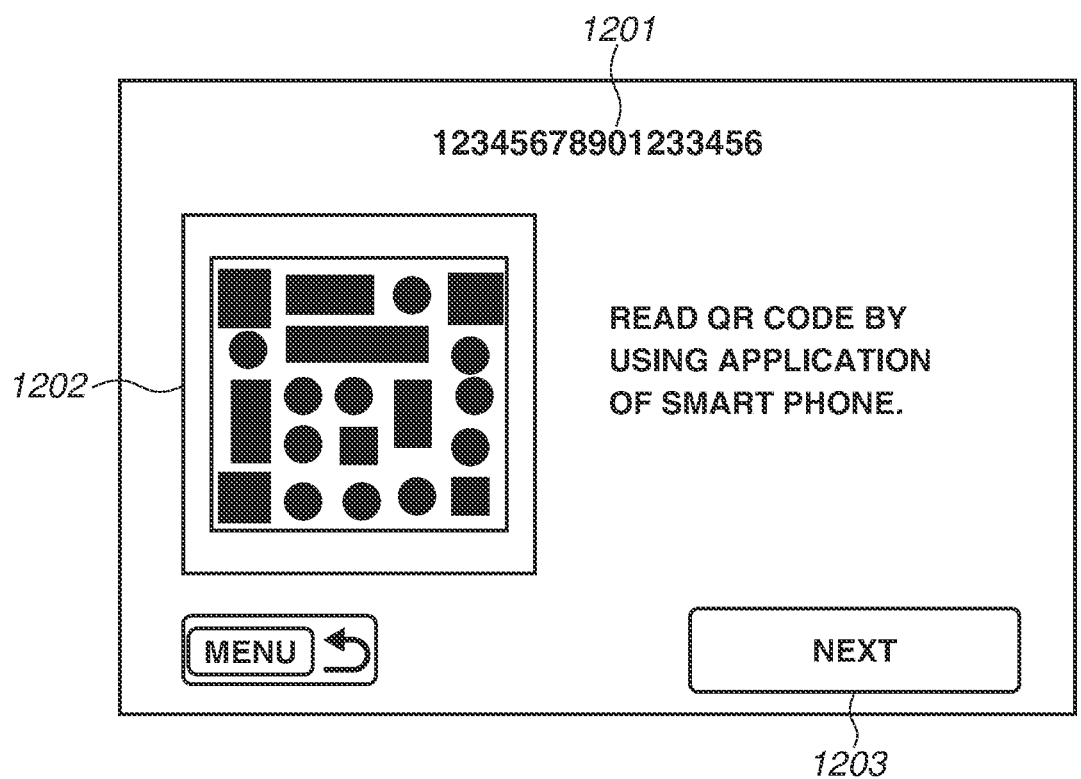
FIG. 12 illustrates an example of a screen displayed on the camera according to the first and the second exemplary embodiments.

FIG. 12 illustrates a screen example displayed in step S501. Information 1201 at the top of the screen is the random number, and information 1202 on the left-hand side of the screen is the QR code. The guidance to the user displayed on the smart phone 500 in step M412 includes a message that prompts the user to operate an operation button 1203 in FIG. 12.

In response to the operation button 1203 being operated, then in step S502, the control unit 101 activates the wireless communication unit 111 to start a wireless connection with the access point 200. In step S503, the control unit 101 checks whether the wireless connection between the wireless communication unit 111 and the access point 200 is successful. If the connection is successful (YES in step S503), the processing proceeds to step S504. In step S504, the control unit 101 transmits the random number and the camera information to the web server 400 via the wireless communication unit 111 and the public network 300.

In step S505, the control unit 101 then receives the registration result and the camera identification information for uniquely specifying the camera registered by the web server 400 from the web server 400, via the wireless communication unit 111. In step S506, the control unit 101 deactivates the wireless communication unit 111. After deactivating the wireless communication unit 111, then in step S507, the control unit 101 checks whether the registration result indicates the success or failure. If the registration is successful (YES in step S507), the processing proceeds to step S508. In step S508, the control unit 101 displays a message indicating that the registration to the web server 400 is successful, a message for prompting the user to confirm whether to store the camera identification information, and the camera information. In step S509, the user selects OK or Cancel on the operation t 105. This selection operation is intended to prompt the user to confirm whether to register the target camera to the web server 400. If the user selects OK (YES in step S509), the processing proceeds to step S510. In step S510, the control unit 101 stores the camera identification information in the nonvolatile memory 103. In step S511, the control unit 101 causes the display unit 106 to display a message indicating that the registration to the web server 400 is completed.

If the wireless connection has failed (NO in step S503), the processing proceeds to step S512. In step S512, the control unit 101 deactivates the wireless communication unit 111. In step S513, the control unit 101 causes the display unit 106 to display an error message. Here, the display unit 106 displays an error message indicating that the wireless connection has failed.

If it is determined that the registration has failed (NO in step S507), the processing proceeds to step S513. In step S513, the control unit 101 instructs the display unit 106 to display an error message. In this case as well, the processing may proceed to step S512. In step S512, the control unit 101 may deactivate the wireless communication unit 111. Here, the display unit 106 displays a message indicating that the registration to the web server 400 has failed. Possible causes of the error include a case where the temporary registration has not yet been performed by the smart phone 500, a case where the random number and the camera information are not transmitted to the web server 400 even after a predetermined time period has elapsed since the temporary registration is performed so that the effective period expires, and a case where other users have performed the temporary registration based on the same random number. Possible causes of the error further include a case where an access concentration or a system error occurs on the web server 400. Descriptions of the error may be displayed for each of the above-described cases, or only a failure message may be displayed.

If the user selects Cancel (NO in step S509), the processing proceeds to step S511. In step S514, the control unit 101 cancels the camera identification information received from the web server 400. In this case, the camera 100 behaves as a camera unregistered to the web server 400.

Figure 7:
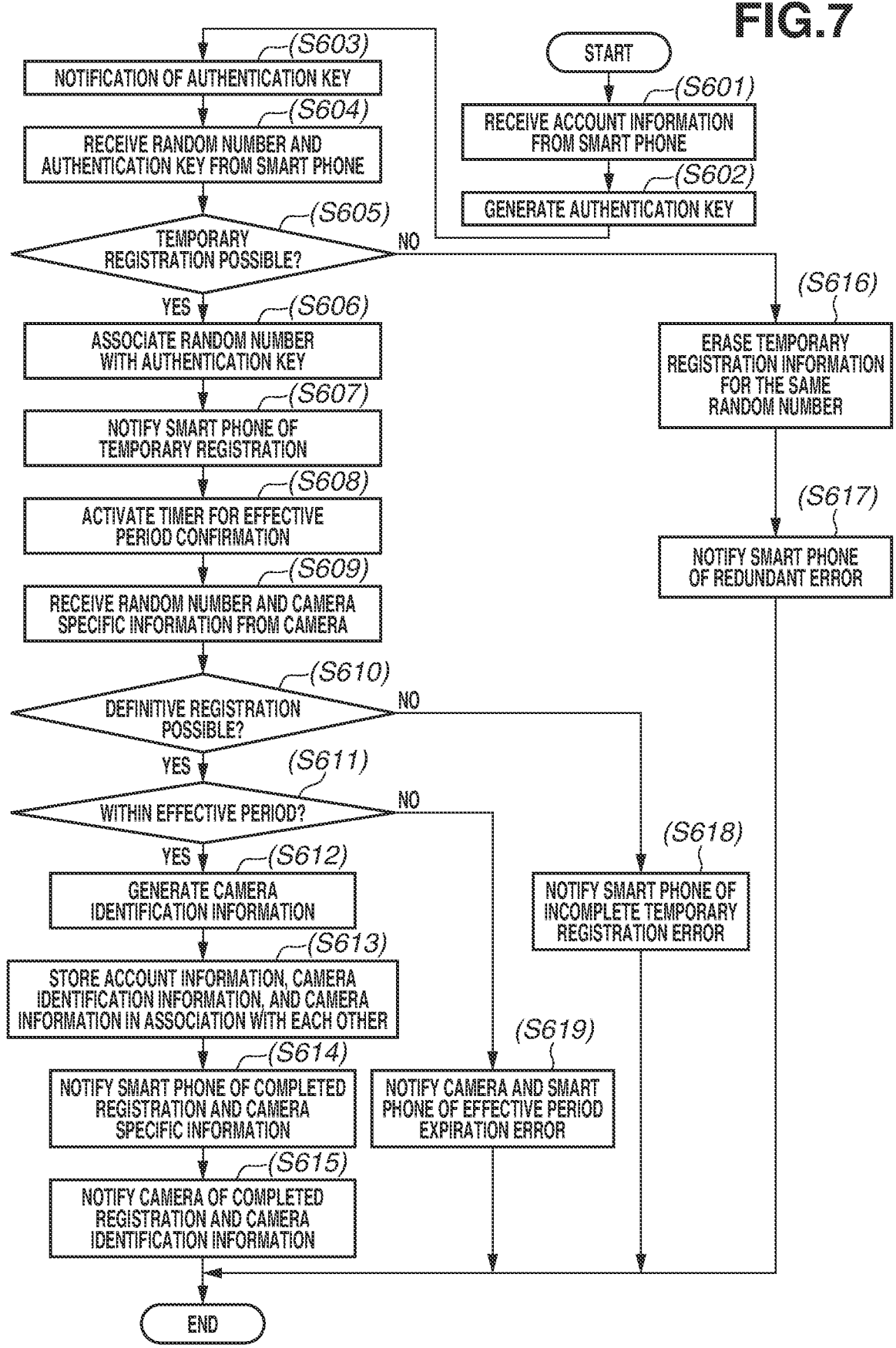
FIG. 7 is flowchart illustrating operations of a web server according to the first exemplary embodiment.

FIG. 7 is a flowchart illustrating operations of the web server 400 according to the present exemplary embodiment.

Initially, in step S601, the web server 400 receives an account. ID and a password for login from the smart phone 500. In step S602, the authentication information processing unit 410 of the web server 400 generates an authentication key with which a user is uniquely determined based on the received account ID. In step S603, the web server 400 notifies the smart phone 500 of the authentication key.

In step S604, the web server 400 receives the random number and the authentication key from the smart phone 500 that has captured the image of the QR code displayed on the camera 100. In step S605, the authentication information processing unit 410 checks whether another authentication key is registered with the same random number as the one received in step S604, to check whether the temporary registration is possible with the notified authentication key. If the temporary registration is possible, in other words, if the authentication information processing unit 410 determines that no other authentication keys with the same random number is present (YES in step S605), the processing proceeds to step S606. In step S606, the authentication information processing unit 410 stores the authentication key and the random number in the nonvolatile memory 403 in association with each other. In step S607, the web server 400 notifies the smart phone 500 that the temporary registration is successful. In step S608, the control unit 401 activates a timer for checking the effective period of the temporary registration.

In step S609, the web server 400 receives the random number and the camera information from the camera 100 via the communication unit 411. In step S610, the authentication information processing unit 410 checks whether the same random number as the one received in step S609 is present in the temporarily registered authentication keys. If the same random number is present (YES in step S610), the processing proceeds to step S611. In step S611, the control unit 401 checks whether the effective period does not expire. If the effective period does not expire, it is determined that the registration is successful (YES in step S611), the processing proceeds to step S612. In step S612, the control unit 401 generates camera identification information. After the camera identification information is generated, then in step S613, the control unit 401 stores the account ID and the specific information about the camera 100 received in step S601, and the camera identification information in the nonvolatile memory 403 in association with each other. After storing the information, then in step S614, the control unit 401 notifies the smart phone 500 that the registration of the camera 100 is completed and transmits the specific information for the camera 100. Subsequently, in step S615, the control unit 401 provides information indicating that the registration of the camera 100 is completed and the camera identification information, to the camera 100.

While a description has been provided of an example in which the operations in step S609 and subsequent steps are started after completion of the operations in steps S601 to S608, the operations in steps S601 to S608 may be executed independently of and in parallel with the operations in step S609 and subsequent steps. Thus, the temporary registration may not have been completed at the time of reception of a random number from the camera 100 in step S609. In such a case, a result of the determination in step S610 indicates that the same random number as the one received in step S609 is not present.

If the authentication information processing unit 410 determines that the same random number is registered with another authentication key (NO in step S605), the processing proceeds to step S616. In step S616, the authentication information processing unit 410 erases the temporary registration information for the other authentication key from the nonvolatile memory 403 without storing the authentication key and the random number received in step S604. This prevents the camera 100 from being associated with other unintended users. In step S617, the web server 400 notifies the smart phone 500 and the information processing apparatus that has distributed the other authentication key that the temporary registration has failed because of the duplication of random numbers. On the other hand, in a case where the random number provided by the camera 100 is not found from among the random numbers of the temporarily registered authentication keys (NO in step S610), the processing proceeds to step S618. In step S618, the web server 400 notifies the camera 100 and the smart phone 500 that the temporary registration has failed due to the absence of temporary registration information. If the effective period expires (NO in step S611), the processing proceeds to step S619. In step S619, the control unit 401 notifies the camera 100 and the smart phone 500 that the temporary registration has failed due to the expiration of the effective period. The setting of the effective period reduces the possibility of the duplication of random numbers.

Figure 8:
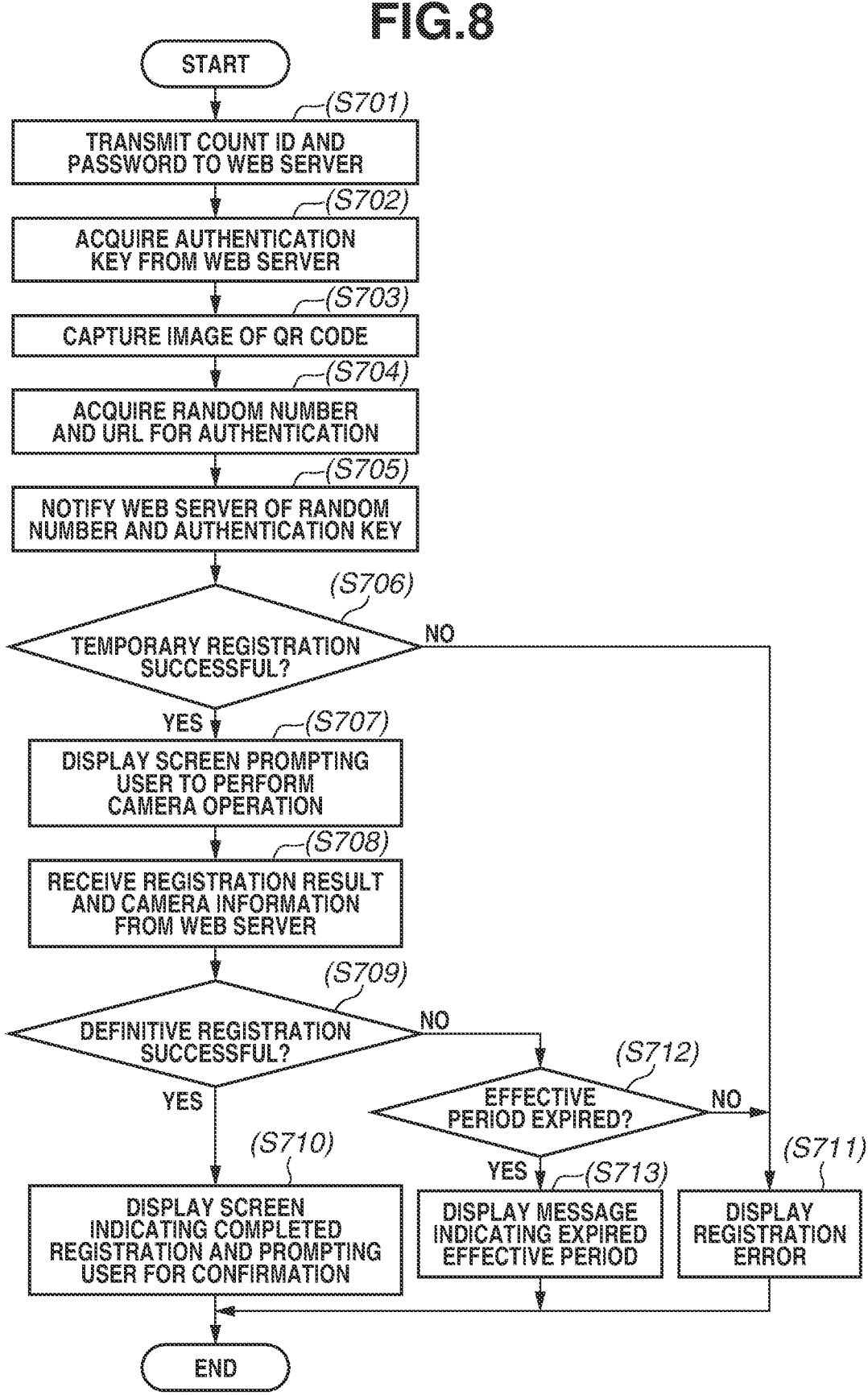
FIG. 8 is flowchart illustrating operations of a smart phone according to the first exemplary embodiment.

FIG. 8 is a flowchart illustrating operations of the smart phone 500 according to the present exemplary embodiment.

In step S701, the user inputs an account ID and a password on the smart phone 500 and then transmits them to the web server 400. After the transmission, then in step S702, the smart phone 500 receives an authentication key from the web server 400. In step S703, the user subsequently captures an image of the QR code displayed on the camera 100 by using the smart phone 500. In step S704, the smart phone 500 acquires a random number and a URL for authentication based on the read QR code. In step S705, the smart phone 500 transmits the authentication key and the random number to the web server 400. In step S706, the smart phone 500 receives a response from the web server 400 and then checks a result of the temporary registration. If the temporary registration is successful (YES in step S706), the processing proceeds to step S707. In step S707, the smart phone 500 displays a message prompting the user to continue the registration processing with the camera 100.

In step S708, the smart phone 500 subsequently receives the result of the temporary registration of the camera 100 and the specific information for the camera. 100 from the web server 400. In step S709, the smart phone 500 checks whether a definitive registration is successful. When the definitive registration is successful (YES in step S709), the processing proceeds to step S710. In step S710, the smart phone 500 displays a message indicating that the definitive registration is completed and the serial number of the camera 100.

If the temporary registration has failed (NO in step S706), the processing proceeds to step S711. In step S711, the smart phone 500 displays a message indicating that the temporary registration has failed. If the definitive registration has failed (NO in step S709), the processing proceeds to step S712. In step S712, the smart phone 500 checks whether the effective period expires. If the effective period expires (YES in step S712), the processing proceeds to step S713. In step S713, the smart phone 500 displays a message indicating that the effective period expires. If the effective period does not expire (NO in step S712), the processing proceeds to S711. In step S711, the smart phone 500 displays a message indicating that the definitive registration has failed.

As described above, according to the present exemplary embodiment, the smart phone 500 captures an image of the QR code generated and displayed by the camera 100, thus enabling the user to register the camera 100 to the web server 400 without inputting complicated information on the operation unit 105 of the camera 100. More specifically, in an information processing system including the camera 100 (image processing apparatus), the smart phone 500 (information processing apparatus), and the web server 400 (server apparatus), the camera 100 generates a random number (identification information) and displays a QR code (image) representing the generated random number. The camera 100 transmits the generated random number to the web server 400 (first transmission). The smart phone 500 captures an image of the QR code displayed on the camera 100, acquires a random number based on the captured QR code, and transmits the acquired random number to the web server 400 (second transmission). The web server 400 receives the random number transmitted from the camera 100 (first reception), receives the random number transmitted from the smart phone 500 (second reception), and then registers the camera 100 based on the match between the random numbers, thus improving the user's operability.

A second exemplary embodiment of the present invention will be described below. The hardware configurations of the camera 100 and the smart phone 500 are similar to those illustrated in FIG. 1, and the hardware configuration of the web server 400 is similar to that illustrated in FIG. 3.

Figure 9:
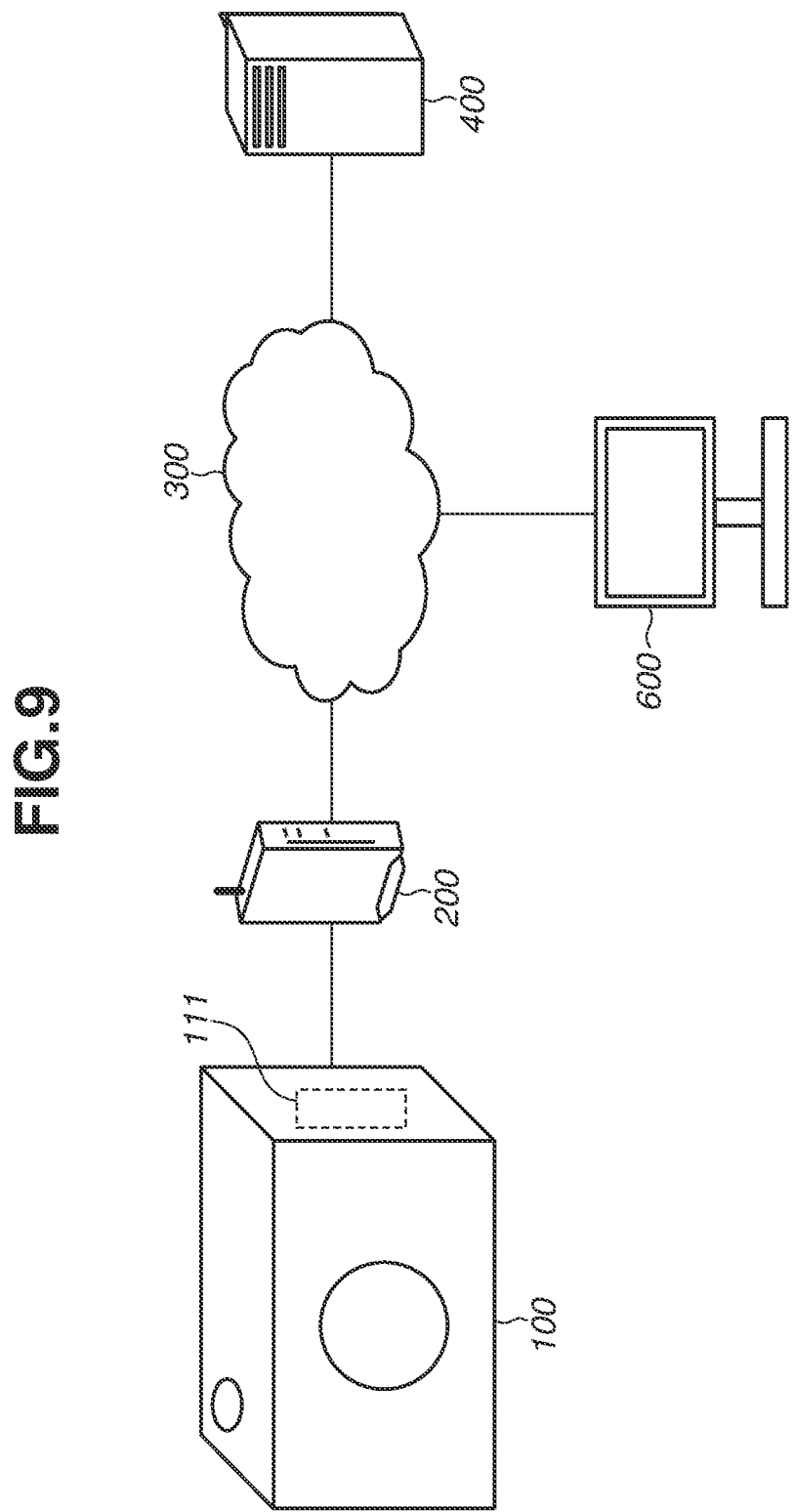
FIG. 9 is a schematic view illustrating the entire system according to the second exemplary embodiment.

FIG. 9 is a schematic view illustrating the entire system according to the second exemplary embodiment. FIG. 9 differs from FIG. 4 schematically illustrating the first exemplary embodiment in that the smart phone 500 is replaced with a personal computer 600. The present exemplary embodiment assumes a case of using an information processing terminal not having a QR code reading function, such as one provided by the smart phone 500.

Figure 10:
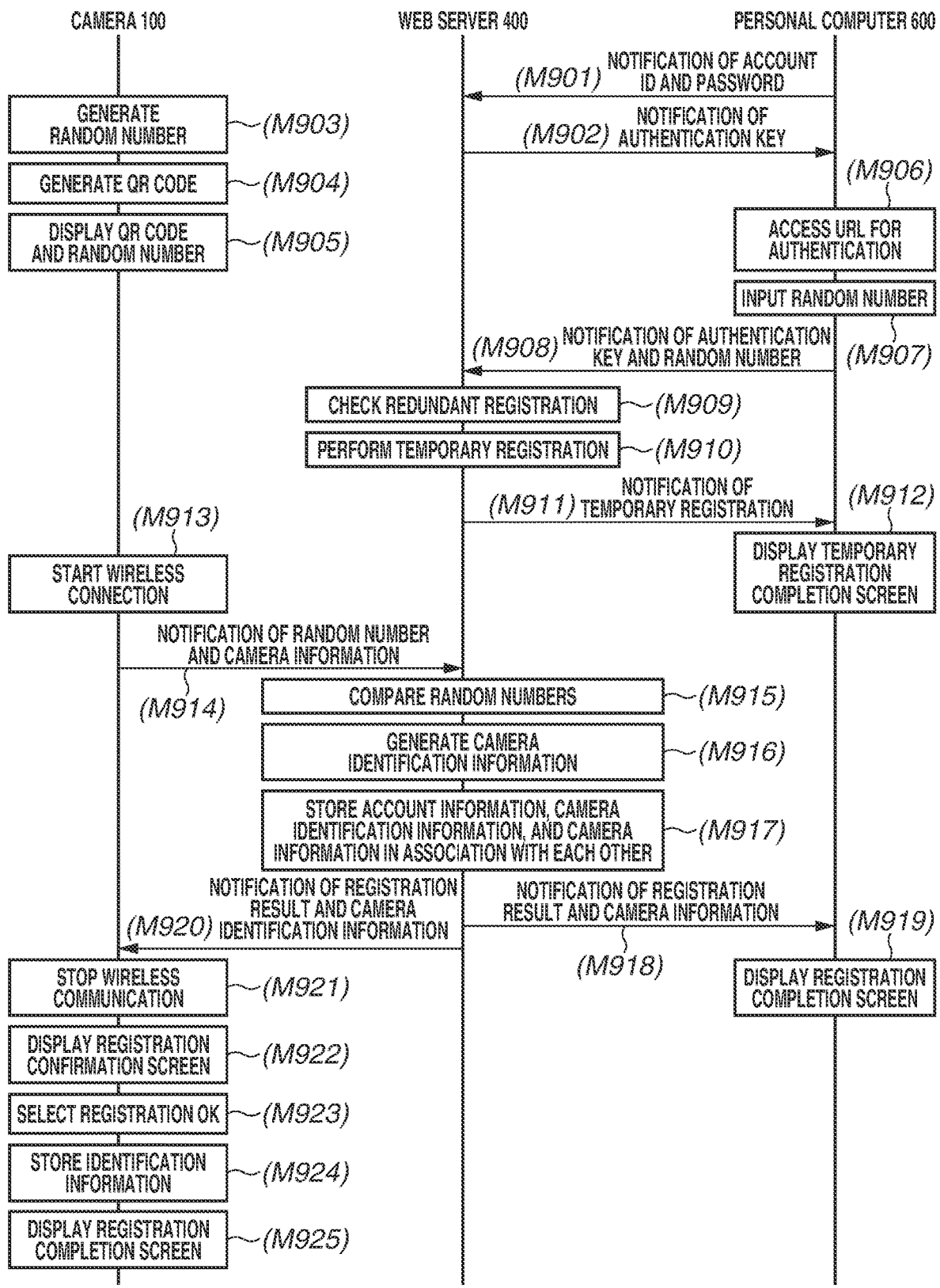
FIG. 10 is a sequence diagram illustrating overall processing according to the second exemplary embodiment.

FIG. 10 is a sequence diagram according to the present exemplary embodiment in which the user accesses a URL for authentication displayed on the camera 100 by using the personal computer 600, inputs a random number, and then registers the camera 100 to the with web server 400.

The operations in steps M901 to M905 are similar to those in steps M401 M405, respectively, in the sequence according to the first exemplary embodiment (FIG. 5), and redundant descriptions thereof will be omitted.

In step M906, the user manually inputs the URL for authentication of the web server 400 by using the personal computer 600 to access the URL. The URL for authentication is assumed to be described in a web page or an instruction manual, or may be displayed on the camera 100. In step M907, the user accesses the URL for authentication by using the personal computer 600 and then inputs the random number displayed on the camera 100.

The operations in steps M908 to M925 are similar to those in steps M408 to M425, respectively, in the sequence according to the first exemplary embodiment (FIG. 5), and redundant descriptions thereof will be omitted.

Figure 11:
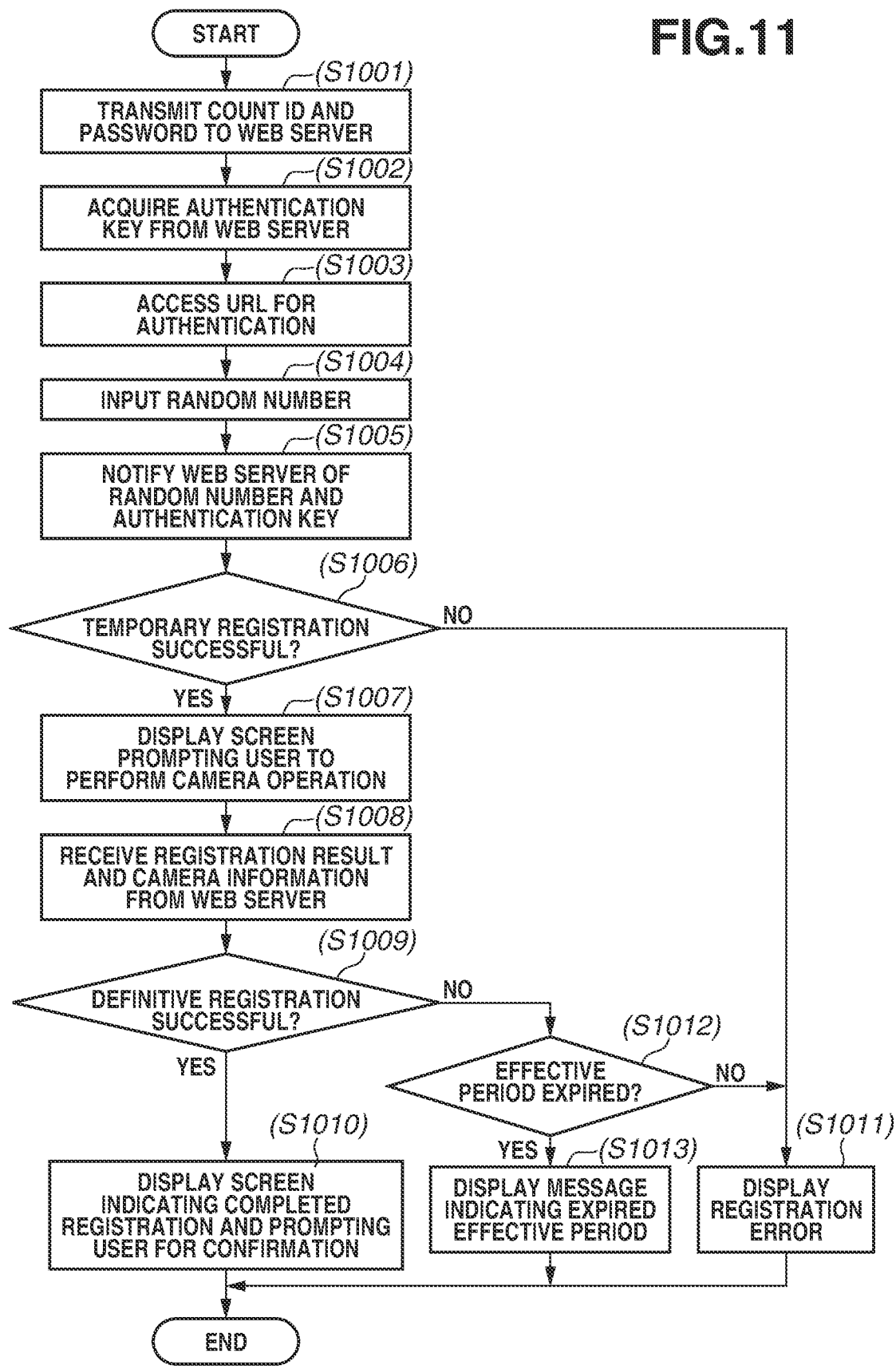
FIG. 11 is a flowchart illustrating operations of a personal computer according to the second exemplary embodiment.

FIG. 11 is a flowchart illustrating operations of the personal computer 600 according to the present exemplary embodiment. The flowcharts of the camera 100 and the web server 400 are similar to those according to the first exemplary embodiment, and redundant descriptions thereof will be omitted.

The operations in steps S1001 and S1002 are similar to those in steps S701 and S702, respectively, in the flowchart according to the first exemplary embodiment (FIG. 8), and redundant descriptions thereof will be omitted.

In step S1003, the user manually inputs the URL for authentication of the web server 400 by using the personal computer 600 to access the URL. After accessing the URL for authentication, then in step S1004, the user inputs the random number displayed on the camera 100 by using the personal computer 600.

The operations in steps S1005 to S1013 are similar to those in steps S705 to S713, respectively, in the flowchart according to the first exemplary embodiment (FIG. 8), and redundant descriptions thereof will be omitted.

According to the present exemplary embodiment, even in a case where the personal computer 600 that cannot read a QR code is used, the camera 100 can be registered to the web server 400 without input of setting information for the registration to the web server 400 through the operation unit 105 of the camera 100, as described above. More specifically, in an information processing system including the camera 100 (image processing apparatus), the smart phone 500 (information processing apparatus), and the web server 400 (server apparatus), the camera 100 generates a random number (identification information) and displays the generated random number. The camera 100 transmits the generated random number to the web server 400 (first transmission). The smart phone 500 receives an input of the random number displayed on the camera 100 from the user, and then transmits the received random number to the web server 400 (second transmission). The web server 400 receives the random number transmitted from the camera 100 (first reception), receives the random number transmitted from the smart phone 500 (second reception), and then registers the camera 100 based on the match between the random numbers, thus improving the user's operability.

Displaying the QR code and the random number in the same screen of the camera 100 eliminates the need of prompting the user to select the use of the smart phone 500 or the personal computer 600, on the camera 100. This simplifies operations of the camera 100, improving the user's operability.

A third exemplary embodiment of the present invention will be described below. The hardware configurations of the camera 100 and the smart phone 500 are similar to those illustrated in FIG. 1, and the hardware configuration of the web server 400 is similar to that illustrated in FIG. 3.

Figure 13:
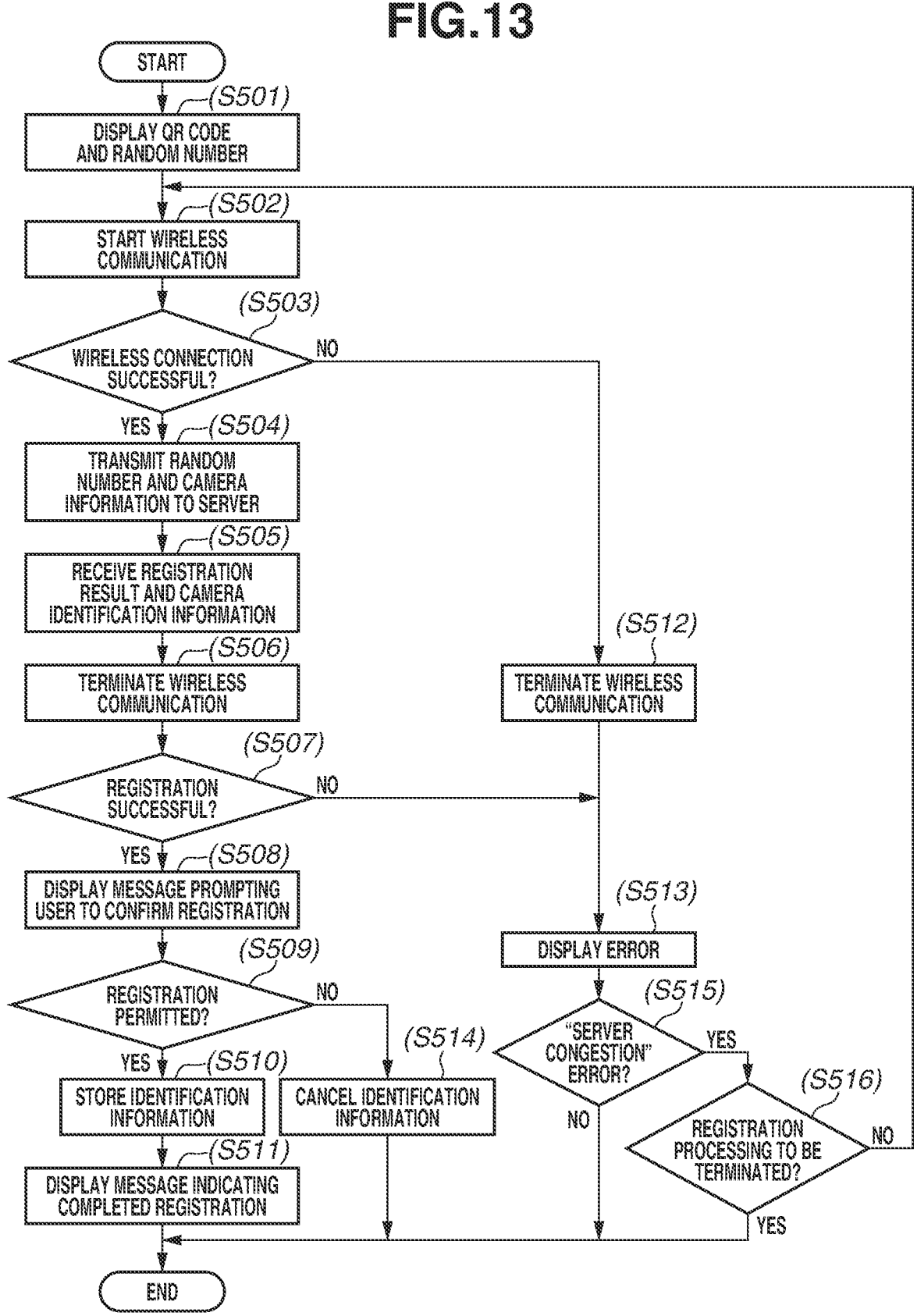
FIG. 13 is flowchart illustrating operations of a camera according to a third exemplary embodiment.

FIG. 13 is a flowchart illustrating operations of the camera 100 according to the third exemplary embodiment, corresponding to FIG. 6 according to the first exemplary embodiment. In comparison with the flowchart in FIG. 6, steps S515 and S516 are added.

In step S515, the control unit 101 checks whether the cause of error is a busy condition due to an access concentration to the web server 400 (server congestion). If the cause of error is other than the busy condition (NO in step S515), the camera 100 terminates the processing of the registration) the web server 400. If the error is the busy condition (YES in step S515), the processing proceeds to step S516. In step S516, the camera 100 displays a message for prompting the user to select whether to terminate the processing for the registration to the web server 400 on the display unit 106, and receives an instruction from the user. If the user instructs not to terminate the registration processing (NO in step S516), the processing returns to step S502. In this case, the camera 100 maintains the random number generated in step S501. This enables resuming the registration processing without reading the QR code again by using the smart phone 500.

In a case where the registration has failed (NO in step S507), the control unit 101 may determine whether to deactivate the wireless communication unit 111 depending on the cause of error. More specifically, in a case where the cause of error is a busy condition due to an access concentration to the web server 400, the control unit 101 may resume the processing from step S504 without deactivating the wireless communication unit 111. This enables resuming the processing from a state in which the wireless connection between the wireless communication unit 111 and the access point 200 is maintained, making it possible to omit the time period required for the wireless connection.

Figure 14:
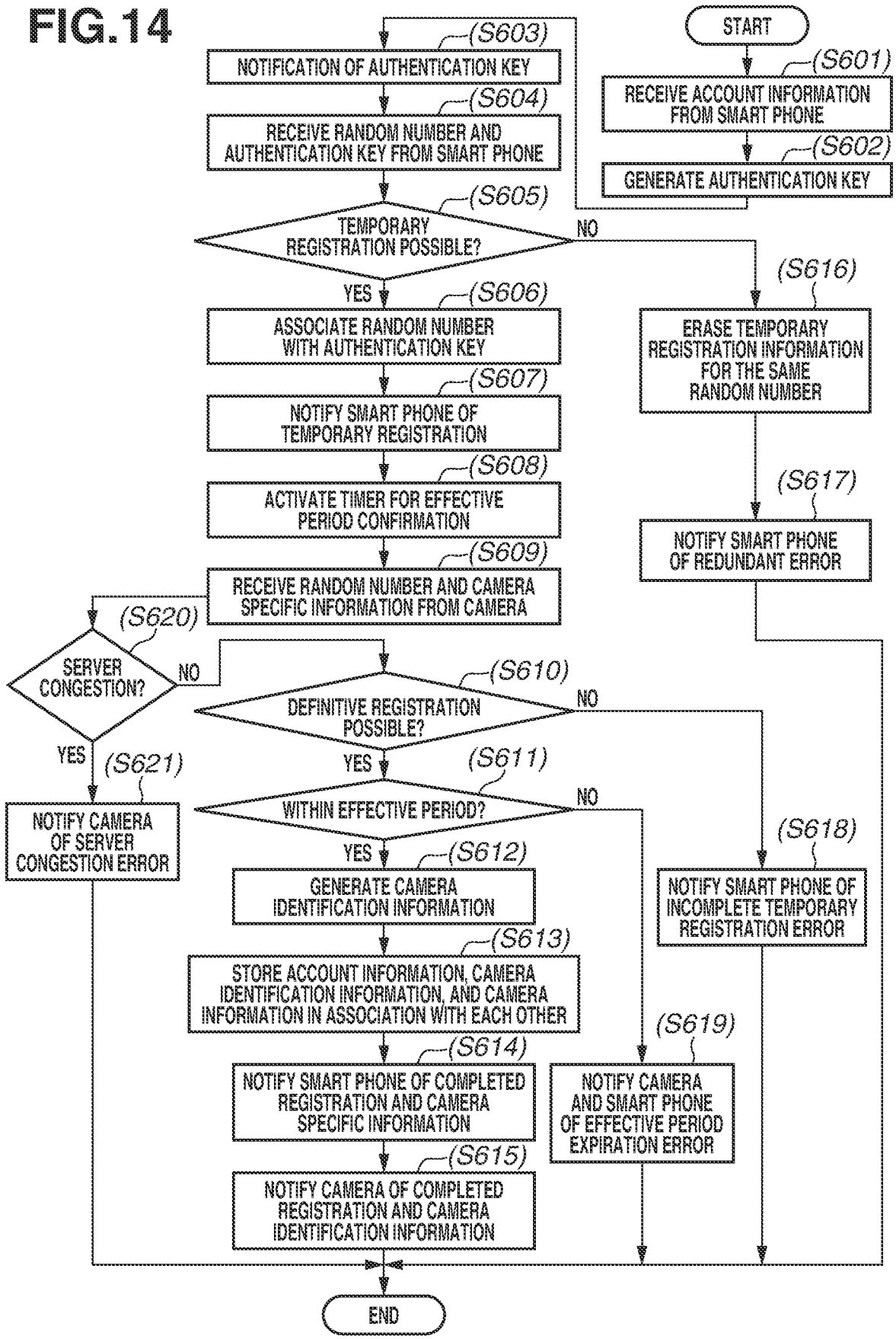
FIG. 14 is flowchart illustrating operations of a web server according to the third exemplary embodiment.

FIG. 14 is flowchart illustrating operations of the web server 400 according to the present exemplary embodiment, corresponding to FIG. 7 according to the first exemplary embodiment. In comparison with the flowchart in FIG. 7, steps S620 and S621 are added.

In step S620, the control unit 401 checks whether an access concentration to the web server 400 occurs. If no access concentration occurs (NO in step S620), the processing proceeds to step S610. If a congestion due to an access concentration to the web server 400 occurs (YES in step S620), the processing proceeds to step S621. In step S621, the control unit 101 transmits an error notification indicating that the congestion in the web server 400 occurs to the camera 100.

As described above, the present exemplary embodiment makes it possible to perform a retry (retransmission) without generating an authentication key again if an error is caused by the server congestion, thus reducing the processing load and operating procedures.

Other Embodiments

Embodiment(s) of the present invention can also be realized by a computer of a system or apparatus that reads out and executes computer executable instructions (e.g., one or more programs) recorded on a storage medium (which may also be referred to more fully as a 'non-transitory computer-readable storage medium') to perform the functions of one or more of the above-described embodiment(s) and/or that includes one or more circuits (e.g., application specific integrated circuit (ASIC)) for performing the functions of one or more of the above-described embodiment(s), and by a method performed by the computer of the system or apparatus by, for example, reading out and executing the computer executable instructions from the storage medium to perform the functions of one or more of the above-described embodiments) and/or controlling the one or more circuits to perform the functions of one or more of the above-described embodiment(s). The computer may comprise one or more processors (e.g., central processing unit (CPU), micro processing unit (MPU)) and may include a network of separate computers or separate processors to read out and execute the computer executable instructions. The computer executable instructions may be provided to the computer, for example, from a network or the storage medium. The storage medium may include, for example, one or more of a hard disk, a random-access memory (RAM), a read only memory (ROM), a storage of distributed computing systems, an optical disk (such as a compact disc (CD), digital versatile disc (DVD), or Blu-ray Disc (BD)™), a flash memory device, a memory card, and the like.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Applications No. 2021-050079, filed Mar. 24, 2021, and No. 2022-012431, filed Jan. 28, 2022, which are hereby incorporated by reference herein in their entirety.

What is claimed is:

1. An information processing system including an image processing apparatus, an information processing apparatus, and a server apparatus,
wherein the image processing apparatus comprises:
first one or more processors; and
first at least one memory storing first executable instructions, which when executed by the first one or more processors, cause the image processing apparatus to perform operations comprising:
generating first identification information, the first identification information including a random string of characters generated by the image processing apparatus;
displaying a Quick Response (OR) code including a Uniform Resource Locater (URL) related to the server apparatus and the first identification information on a display of the image processing apparatus; and
transmitting the first identification information to the server apparatus, wherein the information processing apparatus comprises:
second one or more processors; and
second at least one memory storing second executable instructions, which when executed by the second one or more processors, cause the information processing apparatus to perform operations comprising:
capturing the QR code displayed on the display of the image processing apparatus;
analyzing the captured QR code and decoding second identification information and the URL from the captured QR code, the second identification information including the random string of characters same as the random string of characters included in the first identification information; and
transmitting the second identification information to the server apparatus by using the decoded URL, and
wherein the server apparatus comprises:
third one or more processors; and
third at least one memory storing third executable instructions, which when executed by the third one or more processors, cause the server apparatus to perform operations comprising:
receiving the first identification information transmitted by the image processing apparatus;
receiving the second identification information transmitted by the information processing apparatus;
determining that the random string of characters included in the first identification information matches the random string of characters included in the second identification information by comparing the first identification information with the second identification information; and
registering the image processing apparatus based on the determining that the random string of characters included in the first identification information matches the random string of characters included in the second identification information.

2. The information processing system according to claim 1, wherein the registering registers the image processing apparatus in association with account information for a service provided by the server apparatus.

3. The information processing system according to claim 1, wherein the registering registers the image processing apparatus by storing a serial number or Media Access Control (MAC) address of the image processing apparatus.

4. The information processing system according to claim 1, wherein the third executable instructions, when executed by the third one or more processors, further cause the server apparatus to perform operations comprising:
generating, in a case where the image processing apparatus is to be registered, apparatus identification information for identifying the image processing apparatus; and
providing the image processing apparatus with the apparatus identification information.

5. The information processing system according to claim 1, wherein the third executable instructions, when executed by the third one or more processors, further cause the server apparatus to perform notifying that the image processing apparatus has been registered.

6. The information processing system according to claim 1, wherein the third executable instructions, when executed by the third one or more processors, further cause the server apparatus to perform notifying the information processing apparatus of an error in a case where, when the second identification information is received by the server apparatus, identification information that matches the second identification information is redundantly received.

7. The information processing system according to claim 1, wherein the third executable instructions, when executed by the third one or more processors, further cause the server apparatus to perform notifying the image processing apparatus of an error in a case where, when the first identification information is received by the server apparatus, identification information that matches the first identification information has not been received by the server apparatus.

8. The information processing system according to claim 1, wherein the third executable instructions, when executed by the third one or more processors, further cause the server apparatus to perform notifying the image processing apparatus of an error in a case where, when the first identification information is received by the server apparatus, an access concentration to the server apparatus occurs.

9. The information processing system according to claim 8, wherein, in a case where an error notification indicating an access concentration to the server apparatus is received by the image processing apparatus, the image processing apparatus retransmits the first identification information to the server apparatus.

10. The information processing system according to claim 9, wherein, in a case where an error notification indicating an access concentration to the server apparatus is received by the image processing apparatus, the image processing apparatus retransmits the first identification information in accordance with an instruction from a user.

11. An image processing apparatus configured to communicate with an information processing apparatus and a server apparatus, the image processing apparatus comprising:
one or more processors; and
at least one memory storing executable instructions, which when executed by the one or more processors, cause the image processing apparatus to perform operations comprising:
generating first identification information, the first identification information including a random string of characters generated by the image processing apparatus;
displaying a Quick Response (OR) code including a Uniform Resource Locater (URL) related to the server apparatus and the first identification information on a display of the image processing apparatus, wherein the information processing apparatus is configured to capture the QR code displayed on the display and analyze the captured QR code and decode second identification information and the URL from the captured QR code, the decoded second identification information including the random string of characters same as the random string of characters included in the first identification information;

transmitting the first identification information to the server apparatus;

receiving, from the server apparatus, information indicating that the image processing apparatus is registered to the server apparatus, wherein the image processing apparatus is registered to the server apparatus based on the server apparatus determining that the random string of characters included in the first identification information matches the random string of characters included in the second identification information by comparing the first identification information with the second identification information, the server apparatus having received the first identification information transmitted by the image processing apparatus and the second identification information transmitted from the information processing apparatus that has captured the QR code displayed on the display; and notifying a user that the image processing apparatus is registered to the server apparatus.

12. An information processing apparatus configured to communicate with an image processing apparatus and a server apparatus, the information processing apparatus comprising:

one or more processors; and at least one memory storing executable instructions, which when executed by the one or more processors, cause the information processing apparatus to perform operations comprising:

capturing a Quick Response (OR) code including a Uniform Resource Locater (URL) related to the server apparatus and first identification information including a random string of characters generated by the image processing apparatus, displayed on the image processing apparatus;

analyzing the captured QR code and decoding second identification information and the URL from the captured QR code, the second identification information including the random string of characters same as the random string of characters included in the first identification information;

transmitting the decoded second identification information to the server apparatus by using the decoded URL;

receiving, from the server apparatus, information indicating that the image processing apparatus is registered to the server apparatus, wherein the image processing apparatus is registered to the server apparatus based on the server apparatus determining that the random string of characters included in the first identification information matches the random string of characters included in the received second identification information by comparing the first identification information with the received second identification information, the server apparatus having received the second identification information transmitted by the information processing apparatus and the first identification information transmitted from the image processing apparatus to the server apparatus; and notifying a user that the image processing apparatus is registered to the server apparatus.

13. An information processing method in an information processing system including an image processing apparatus, an information processing apparatus, and a server apparatus, the information processing method comprising:

at the image processing apparatus:

generating first identification information, the first identification information including a random string of characters generated by the image processing apparatus;

displaying a Quick Response (OR) code including a Uniform Resource Locater (URL) related to the server apparatus and the first identification information on a display of the image processing apparatus; and transmitting the first identification information to the server apparatus, at the information processing apparatus:

capturing the QR code displayed on the display of the image processing apparatus;

analyzing the captured QR code and decoding second identification information and the URL from the captured QR code, the second identification information including the random string of characters same as the random string of characters included in the first identification information; and transmitting the second identification information to the server apparatus by using the decoded URL, and at the server apparatus:

receiving the first identification information transmitted by the image processing apparatus;

receiving the second identification information transmitted by the information processing apparatus;

determining that the random string of characters included in the first identification information matches the random string of characters included in the second identification information by comparing the first identification information with the second identification information; and registering the image processing apparatus based on the determining that the random string of characters included in the first identification information matches the random string of characters included in the second identification information.

14. A non-transitory computer-readable storage medium storing one or more programs including the executable instructions, which when executed by the one or more processors of the image processing apparatus, cause the image processing apparatus to perform the operations according to claim 11.

15. A non-transitory computer-readable storage medium storing one or more programs including the executable instructions, which when executed by the one or more processors of the information processing apparatus, cause the information processing apparatus to perform the operations according to claim 12.

16. The information processing system according to claim 2, wherein the server apparatus is a web server, and wherein the second executable instructions, when executed by the second one or more processors, further cause the information processing apparatus to perform processing for login to the web server based on a user credential accepted from a user, wherein the second identification information is transmitted to the server apparatus together with a key issued upon successful login as a result of the processing for login, and capable of identifying login user, wherein the registering registers the image processing apparatus in association with account information identified by the key received from the information processing apparatus, for a service provided by the web server apparatus.

17. The information processing system according to claim 1, wherein a display item indicating a human readable character string corresponding to the generated random string of characters is displayed on the display together with the QR code.

* * * * *